(12) United States Patent
Flögel et al.

(10) Patent No.: US 8,434,368 B2
(45) Date of Patent: May 7, 2013

(54) MEASURING APPARATUS AND METHOD FOR MANUFACTURING THE MEASURING APPARATUS

(75) Inventors: Karl Flögel, Schopfheim (DE); Thomas Uehlin, Schopfheim (DE); Hansjörg Brock, Grenzach-Wyhlen (DE); Armin Rupp, Weil am Rhein (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 104 days.

(21) Appl. No.: 13/125,743

(22) PCT Filed: Oct. 9, 2009

(86) PCT No.: PCT/EP2009/063180
§ 371 (c)(1),
(2), (4) Date: Jul. 27, 2011

(87) PCT Pub. No.: WO2010/046249
PCT Pub. Date: Apr. 29, 2010

(65) Prior Publication Data
US 2011/0290033 A1 Dec. 1, 2011

(30) Foreign Application Priority Data
Oct. 24, 2008 (DE) .......................... 10 2008 043 169

(51) Int. Cl.
*G01L 7/00* (2006.01)
*B23P 17/04* (2006.01)
(52) U.S. Cl.
USPC ............................... 73/706; 73/756; 29/592.1
(58) Field of Classification Search ............. 73/700–756
See application file for complete search history.

(56) References Cited

U.S. PATENT DOCUMENTS

| | | | | |
|---|---|---|---|---|
| 4,788,867 A * | 12/1988 | Kishel | .............................. | 73/722 |
| 2006/0042394 A1 | 3/2006 | Kosh | | |
| 2008/0156102 A1* | 7/2008 | Kopp | .............................. | 73/706 |
| 2011/0048136 A1* | 3/2011 | Birch et al. | ...................... | 73/705 |
| 2011/0209552 A1* | 9/2011 | Tham et al. | ...................... | 73/702 |
| 2011/0308319 A1* | 12/2011 | Neyens et al. | ................... | 73/700 |
| 2012/0137784 A1* | 6/2012 | Krusemark et al. | ............ | 73/724 |

FOREIGN PATENT DOCUMENTS

| | | |
|---|---|---|
| DE | 196 10 167 C1 | 2/1997 |
| DE | 100 13 218 A1 | 9/2001 |
| DE | 100 64 811 A1 | 6/2002 |
| DE | 201 11 919 U1 | 10/2002 |
| DE | 10 2007 001 445 A1 | 7/2008 |
| EP | 0 766 073 A1 | 4/1997 |
| WO | WO 2005/064278 A2 | 7/2005 |

OTHER PUBLICATIONS

English translation of the International IPR.

* cited by examiner

*Primary Examiner* — Andre Allen
(74) *Attorney, Agent, or Firm* — Bacon & Thomas, PLLC

(57) ABSTRACT

An apparatus for determining and/or monitoring a physical and/or chemical, measured variable of a medium, including a housing, especially an elongated housing, and a sensor arranged in the housing. The sensor serves for registering the measured variable, wherein the housing has at least one opening, through which the sensor comes in contact with the medium. The housing has a first housing section, in which the sensor and a sensor electronics are arranged. The sensor electronics is arranged on a first carrier element. The sensor electronics serves for changing the measured variable into an analog electrical signal. An insert is applied in the first housing section, in which the sensor electronics is arranged. The insert is tubular.

14 Claims, 5 Drawing Sheets

MEASURING APPARATUS AND METHOD FOR MANUFACTURING THE MEASURING APPARATUS

The invention relates to an apparatus for determining and/or monitoring a physical and/or chemical, measured variable of a medium. The apparatus includes: a housing, especially an elongated housing; a sensor arranged in the housing, wherein the sensor serves for registering the measured variable; wherein the housing has at least one opening, through which the sensor comes in contact with the medium; wherein the housing has a first housing section, in which the sensor and sensor electronics are arranged; wherein the sensor electronics is arranged on a first carrier element; and wherein the sensor electronics serves for changing the measured variable into an analog electrical signal.

Furthermore, the invention relates to a method for manufacturing an apparatus for determining and/or monitoring a chemical and/or physical, measured variable of a medium, wherein the apparatus includes a housing with a first housing section, wherein in the first housing section a sensor and a sensor electronics are arranged, wherein the housing has at least one opening, through which the sensor comes in contact with the medium, and wherein the sensor electronics serves for changing the measured variable into an analog electrical signal.

BACKGROUND DISCUSSION

In pressure measuring technology, a distinction is drawn between difference-, absolute- and relative pressure measuring sensors. Pressure difference sensors serve for measuring the difference between two different pressures. In the case of absolute pressure sensors, a pressure to be measured absolutely, i.e. as pressure difference relative to vacuum, is registered. With a relative pressure sensor, a pressure to be measured is registered in the form of a pressure difference relative to a reference pressure. The reference pressure is an ambient pressure, which rules, where the sensor is located. In the case of most applications, this is the atmospheric pressure at the location of use. Relative pressure sensors have usually a measuring chamber, which is sealed with a pressure sensitive, measuring membrane. On an outside of the measuring membrane, there acts, during operation, the pressure to be measured. On a side of the measuring membrane facing away, the chamber has an opening, through which the reference pressure acts in the interior of the chamber against the measuring membrane. Additionally, a measurement transmitter is provided, which converts a deflection of the measuring membrane dependent on the reference pressure and the pressure to be measured into an electrical, measured variable.

For pressure measuring apparatuses of the named types, it proves difficult to achieve a reliable seal between the pressure sensor element and the accommodating tube, without degrading the accuracy of the measurement of the sensor due to mechanical stresses.

It is known from the state of the art to use such pressure measuring transducers for hydrostatic level measurement (see FIG. 1). Among other things, such measuring devices, e.g. the Waterpilot FMX167, are sold by the Endress+Hauser.

These relative pressure sensors usually measure the difference between the pressure in a measured medium and the current atmospheric pressure. For relative pressure measurement, the reference air is led via a platform-side opening into the pressure chamber, and the surface of the measuring membrane facing away from the measuring chamber is supplied with the measured pressure. The resulting deformation of the measuring membrane is a measure for the relative pressure, which is converted in suitable manner into a measurement signal.

The mentioned supply of the reference air enables that moisture can get into the pressure chamber, which, in the case of subceeding, or falling beneath, the dew point, the moisture can condense in the interior of the sensor and degrade the functioning of the sensor. This is especially the case, when the surrounding air of the sensor has a higher temperature than the medium, whose pressure is to be measured.

Usually a ceramic cell is used as pressure measuring cell. The ceramic measuring cell is a dry measuring cell, i.e. the pressure acts directly on the robust ceramic membrane of the pressure measuring transducer and deflects it around max. 0.005 mm. On the electrodes of the ceramic substrate, a pressure-dependent capacitance change caused by the membrane movement is measured. The electronics then converts the capacitance change into a pressure proportional, measurement signal, which behaves linearly for fill level.

Because of the sensitive membrane, already small length changes of the mechanical components of the pressure measuring transducer, for example, length changes caused by temperature changes, affect the measurement signal and/or the mechanical components of the measuring cell. For example, stresses of the potting compound caused, for example, by temperature changes are transferred to the measurement transmitter electronics and, so, corrupt the measurement signal. In the worst case, electrical connections can be torn loose.

SUMMARY OF THE INVENTION

It is, consequently, an object of the invention to provide an apparatus, whose measurement signal and whose mechanical construction are essentially independent of disturbing, environmentally related effects.

The object is achieved by an apparatus for determining and/or monitoring a physical and/or chemical, measured variable of a medium, in the following also referred to as 'measuring apparatus', and a method for manufacturing an apparatus for determining and/or monitoring, a chemical and/or physical, measured variable of a medium.

As regards the apparatus, the object is achieved according to the invention by arranging an insert in the first housing section, in which the sensor electronics is arranged, wherein the insert is essentially tubular.

The insert enables the positioning of the sensor- and/or the main electronics in the first, or second, housing section. Preferably, the insert includes therefor a holder, for example, in the form a groove, in which the sensor electronics, or the carrier element on which the sensor electronics is applied, sits. Furthermore, preferably, the force necessary for sealing the apparatus is transferred through the insert to the sensor arranged in the housing. Additionally, the insert defines a volume of a first potting compound, especially a foamed potting compound. Additionally, the insert of a suitable material provides a thermal as well as electrical insulation between the outer housing and the sensor electronics. Through a suitable dimensioning of the insert, additionally, the required distances for meeting standards relative to explosion protection can be maintained.

In an advantageous further development, the sensor and insert are force (e.g. frictionally) interlocked and/or shape interlocked with one another and are, at least partially, of the same material, especially a ceramic. For example, is the insert, as installed in the apparatus, presses against the sensor, whereby the sensor seals the housing to the outside. Because insert and sensor are, at least partially, of the same material, additionally, for example, temperature related, length changes of the measuring apparatus changes are reduced, or their effects have no significant influence on the measurement signal. As a result, corruption of the measurement signal due to a temperature related, for example, mechanical deformation of the sensor is reduced.

In a favorable embodiment, the insert is filled, at least partially, with a first potting compound, especially a foamed potting compound. The potting compound insulates the sensor electronics from environmentally related influences, such as, for example, moisture getting into the housing. Especially through the capillary effect of temperature changes and the cold flow properties of synthetic materials and potting compounds, moisture can penetrate into the housing. This is especially the case when measuring devices are exposed to high pressure or abrasive environmental conditions. The foamed potting compound in the insert protects the sensor electronics from such disturbing effects. The potting compound foam is preferably a closed-pore foam. In the case of unfavorable geometry of the installation space within the measuring apparatus, in the case of temperature changes, the related expansion of the potting compound causes shifting of the potting compound relative to the housing. This can lead to stresses in the region of the sensor and/or the electronics and even tearing of components or connections. Through the use of compressible foam in the region of the sensor as securement, and moisture, protection, a marked improving of the functioning of the sensor, for example, as regards hysteresis and stress related drift, is achieved.

Additionally, the compressibility of the foamed potting compound means that even in the case of temperature changes no forces occur, which change the positions of the installed objects in the housing. Through the application of a foam as potting compound, volume for potting compound expansion can be omitted, and, thus, space can be saved. The foam can be, for example, a foamed polyurethane.

In an embodiment, the insert is provided, especially internally, at least partially, with an electrically conductive coating. This coating serves as shielding from electromagnetic disturbance sources, which, above all, in the region of the sensor, have a considerable influence on the still not amplitude amplified, analog measurement signal. Additionally, the sensor can be provided on its inner side, at least partially, with the electrically conductive coating. In this way, there arises an especially effective shielding as regards electromagnetic disturbance sources. Additionally, an option is to establish, via the electrically conductive coating of the sensor and of the insert, an electrical contacting of the sensor electronics. Thus, no additional contactings or electrical connections between the sensor electronics and the coating serving as EMC-protection are necessary.

In a further development, the first carrier element divides the internal volume of the insert into at least a first and a second volume portion, and there is at least one communication orifice provided, which connects the first volume portion with the second volume portion. Preferably therefor, an opening is formed in the first carrier element, through which the potting compound can enter from the first into the second volume portion. In this way, is a uniform distribution is obtained in the first and the second volume portion, in the case of filling the insert with potting compound.

In an advantageous further development, a cavity in the first carrier element forms the communication orifice and/or the first carrier element and the insert are so matched to one another, that a cavity between the insert and the carrier element forms the communication orifice. Alternatively, the communication orifice can be an, especially, U-shaped gap between the first carrier element and the wall of the insert. This gap can arise, for example, from a shoulder in the interior of the insert, against which the first carrier element rests, when it is in the insert. In this way, no additional openings or gaps for the de-airing need be provided for filling the insert with a potting compound, in order to assure a complete filling without air inclusions.

In an additional embodiment, at least one filling tube is provided in the insert, which serves to fill the insert with the first potting compound, especially a foamed, potting compound. The filling tube integrated in the insert enables casting of the potting compound into the insert, especially a meterable filling of the potting compound, without that air inclusions arise. Above all, the cooperating filling tube and communication orifice between the first and second volume portion enables a uniform filling of the insert. A filling tube can be placed therefor, for example, in the first and/or in the second housing section.

In a variant, at least a first securement means is provided, by which the first carrier element is arranged in a provided position at least partially within the insert. In this way, the sensor electronics, or the first carrier element, on which the sensor electronics is applied, can be positioned within the insert. Serving as securement means for the first carrier element can be, for example, a cavity functioning as a groove in the insert. The first carrier element is inserted into this cavity, or groove. The groove can extend, for example, along the wall of the insert.

In an additional advantageous form of embodiment, at least a first securement means, by means of which the first carrier element is arranged in a provided position at least partially within the insert, and/or the filling tube are/is component(s) of the insert provided in the first housing section. Above all, in the case of filling the measuring apparatus with a potting compound, this is advantageous in the manufacture and in the assembly, since a number of working steps are combined, or omitted. Furthermore, by the filling tube, a defined filling of the insert and complete embedding of the sensor electronics in the potting compound without air inclusions is assured.

In an advantageous further development, the filling tube brings the potting compound at least to a height perpendicular to the longitudinal axis of the housing in the insert, up to which the communication orifice extends. As a result of this, it is achieved that the outlet of the filling tube lies deeper in the insert, than the upper limit of the communication orifice. This enables a complete filling of the insert, especially of the second volume portion, with the potting compound, starting from the floor of the insert and proceeding upwards. Of advantage is that the insert is filled, based on the proposed construction, from the floor (for example, the sensor forms the floor) of the insert upwardly with the potting compound and air inclusions are, in such case, effectively prevented. The filling tube extends, in such case, for example, along the wall of the insert over at least half, preferably over two thirds, and especially preferably over the height of the insert, so that a filling of the insert with the potting compound can occur starting at the bottom and proceeding upwards.

In a favorable embodiment, a second housing section is provided, which borders on the first housing section, wherein, in the second housing section, a main electronics is placed on a second carrier element, wherein the main electronics is connected electrically, especially via a flexible line arrangement, with the sensor electronics, wherein the main electronics serves to calculate a measured value from the analog electrical signal or a signal derived therefrom. In this way, a mechanical decoupling of the sensor electronics from the main electronics is achieved. It has been found, that such a mechanical decoupling affects the quality of the measurement signal. Above all, for preventing the above-mentioned hysteresis and stress related drift of the measurement signal, the mechanical decoupling the sensor electronics from the main electronics proves to be especially advantageous. Additionally, by dividing the electronics in two, it is achieved that only the sensor electronics receiving and processing the analog measurement signal still needs to be electrically shielded, while the essentially more robust, main electronics needs only to be protected against mechanical and thermal effects. The signal derived from the analog measurement signal can be, for example, a digitized measurement signal.

In an additional embodiment, at least a second securement means is provided, especially a second securement means on the insert, by which the main electronics is arranged, especially movably, in a provided position in the second housing section. Thus, the insert enables also the positioning of the second carrier element, on which the main electronics is placed, in a provided position within the second housing section. The second carrier element, on which the main electronics is applied, is seated within the housing, for example, rotatably about an axis perpendicular to the longitudinal axis of the, especially elongated, apparatus. For such purpose, for example, a cavity functioning as a groove is provided in the insert. The second carrier element is inserted partially into the cavity.

In an additional variant, the main electronics is at least partially embedded within a second potting compound. For insulating and positioning the second carrier element, a potting compound is cast in the second housing section. By the movable arrangement of the second carrier element, damage caused by temperature changes and, associated therewith, expansion of the potting compound is prevented. Through the movable arrangement of the second carrier element, on which the main electronics is applied, such temperature related expansions the potting compound can at least partially be compensated, without damage to the electronics and/or the housing of the measuring apparatus.

In a further development, the sensor electronics and the main electronics are cast in different potting compounds. In this way, different material properties can be compensated and/or potting compounds of different materials optimally matched to one another.

In an additional , the first and/or second potting compound is at least partially of silicone, especially a silicone gel, a polyurethane and/or a closed-pore foam. These materials have, due to their physical and/or chemical properties, especially their resistance, proved to be especially suitable potting compounds.

As regards the method, the object is achieved by features that the sensor electronics mounted on a first carrier element is arranged in an insert, wherein the insert is tubular, and that the insert is applied in the first housing section. The proposed method facilitates the manufacture, especially the assembly, of the apparatus and, thus, reduces the manufacturing costs of the apparatus. Additionally, by providing the prefabricated insert, all, especially standards related, distances are predetermined and must not be re-, or fine, adjusted. The sensor is, for assembly, for example, electrically connected with the sensor electronics applied on the first carrier element by the features that the sensor is, for example, presoldered, and then the sensor electronics located on the first carrier element is introduced into the insert. The sensor can for this be connected with the first carrier element via electrical, conducting cable.

In an embodiment of the method, the sensor and the insert are so arranged in the first housing section, that the housing is sealed. Through the insert, which defines the volume of cast substance, also the sensor is arranged in the housing and the housing sealed. Preferably, the insert includes a collar, with which the insert bears on the sensor and transfers to the sensor the force necessary for sealing the housing. Using a shoulder provided on the insert, screwing of a threaded ring causes the insert to transfer to the sensor the force necessary for sealing the housing. The actual sealing is accomplished, for example, by way of a sealing element in the form of an O-ring.

In an additional embodiment of the method, the sensor electronics is cast with a first potting compound by filling the potting compound into the insert, especially through at least one filling tube. The filling tube enables uniform filling of the first and second volume portion, left and right of the sensor electronics, which is placed on a first carrier element.

In a further development of the method, a main electronics contained in a second housing section of the housing is positioned in the second housing section by means of a second securement means, especially one provided on the insert. This facilitates the introduction and positioning of the second carrier element, on which the main electronics is applied, in the second housing section. Additionally, no additional holders directly on the housing are necessary and the carrier element and the main electronics are, thus, decoupled from the housing. For securing the main electronics applied on the second carrier element, for example, a groove can be provided in the insert, which is opened toward the second housing section toward. This groove is formed, for example, in a part of the insert bounding the first housing section.

In a further development of the method, the sensor electronics is connected electrically with the main electronics via a line arrangement, especially a flexible line arrangement. By means of the flexible line arrangement, the sensor electronics remains electrically connected with the main electronics, but is, however, mechanically decoupled therefrom. For such purpose, for example, a flexible circuit board can be applied.

The main electronics includes, for example, a processor, which acts, for example, as a serial interface to the sensor electronics, receives its raw data, and calculates therefrom a measured value. The calculational result is provided, for example, as a pulse width modulated signal (PWM). Another functionality of the main electronics can be, for example, the generating of the clock signal for the complete measurement transmitter electronics. The main electronics can, for example, also regulate the electrical current supply of the total device. Furthermore, integrated in the main electronics can be a HART modem for communication at the field level. A task of the sensor electronics is to receive measurement signals from the sensor and, in given cases, to normalize its signal level. Thereafter, the normalized values are analog/digital (A/D) converted and, for example, forwarded via an interface to the main electronics. The sensor electronics can, for example, be designed to detect overflows in the internal amplifiers and A/D converters and to report these, for example, in the form of an error telegram, to the main electronics. The main electronics can additionally include a microcontroller, which is required for initializing the processor.

In an advantageous form of embodiment of the method, the main electronics is cast with a second potting compound by filling the second housing section with the second potting compound. By casting the second housing section, the therein seated, main electronics is protected from environmentally related, disturbing influences, as, for example, moisture penetrating via the reference pressure air supply,.

Preferably, the housing includes a connection to a 2L-current loop, with which the main- and the sensor electronics is connected. Additionally, the pressure sensor advantageously includes a temperature sensor.

The sensor can be, for example, an inductive, optical, capacitive, temperature-, pressure- and/or gas sensor.

The invention will now be explained in greater detail based on the appended drawing, the figures of which show as follows:

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
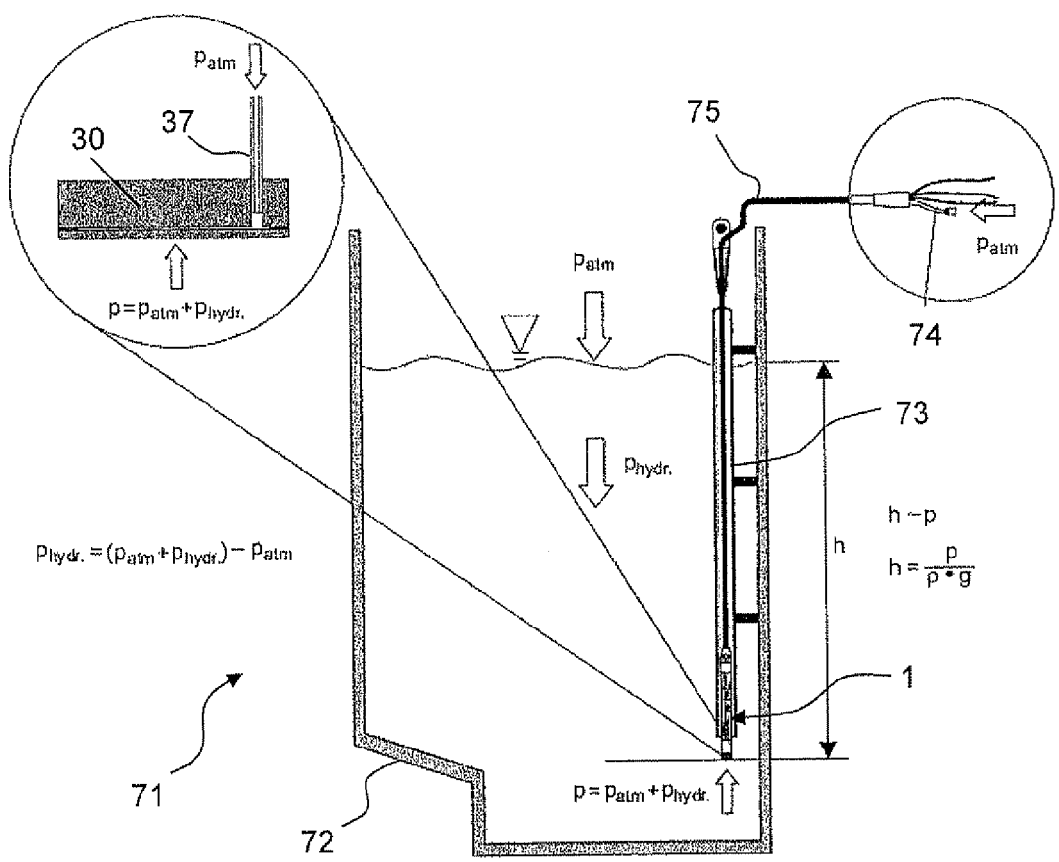
FIG. 1 is an elevational, schematic view of a level probe installation.

FIG. 1 illustrates with a schematic view of a level probe installation 71 the measuring principle of level probe 1. The hydraulic pressure $p_{hydr}$ ascertained by the pressure measuring cell 30 is proportional to the fill level h in the tank 72. For ascertaining the pressure $p_{hydr}$, the level probe 1 is introduced in a protective tube 73 into the tank 72. In this regard, for example, a supplemental weight is secured on the level probe 1. For transmission of the electrical measurement signal, or of a measured value, to a control system or a control room, the level probe 1 is connected to a two conductor, electrical current loop. The shown third wire is a protective conductor. Additionally, a pressure equalizing hose 74 is led through a cable 75 for the supply of the reference pressure to the pressure measuring cell 30. Instead of the shown reference pressure measuring cell, also an absolute pressure measuring cell can be inserted.

Figure 2:
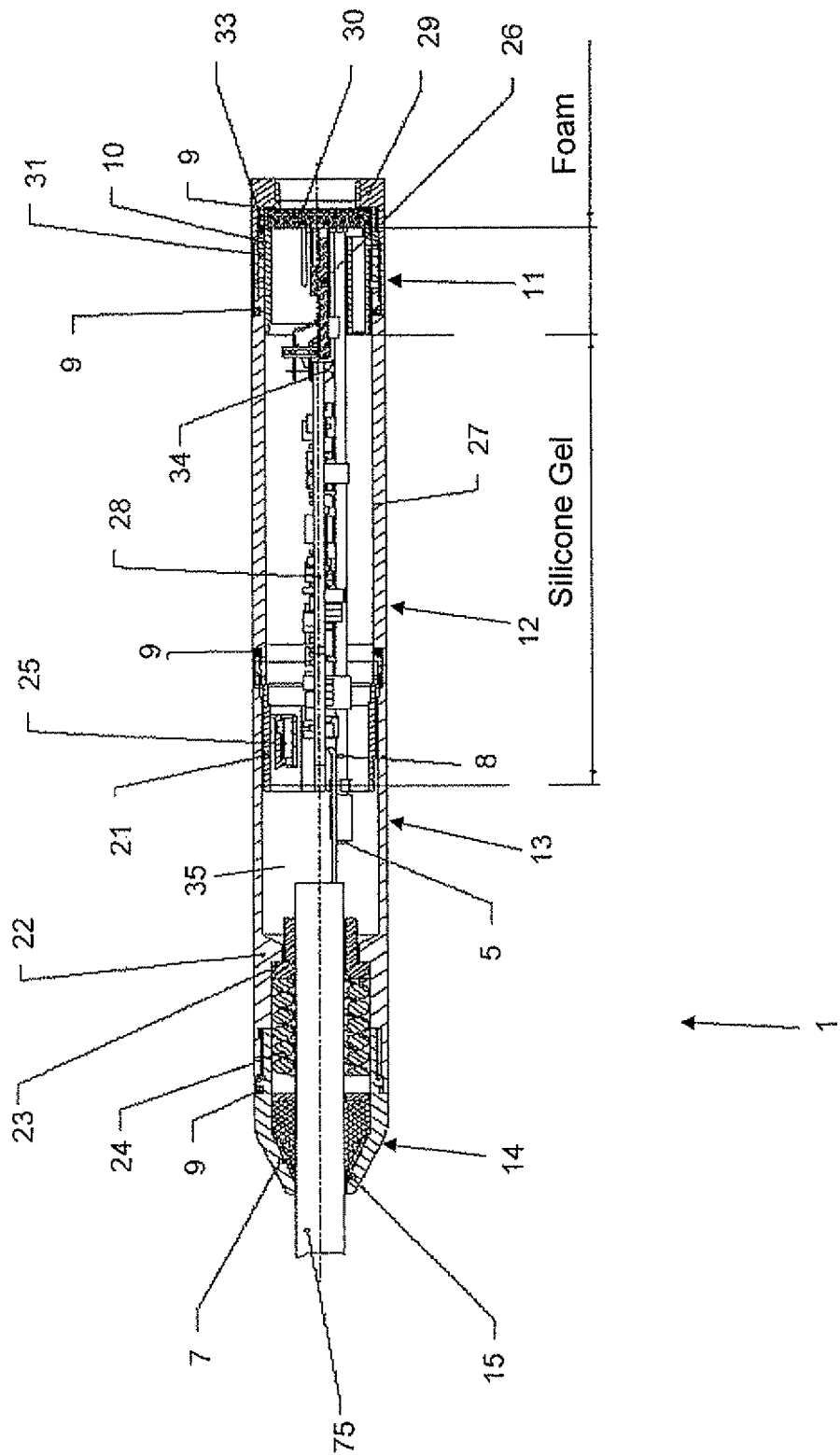
FIG. 2 is a view of the construction of the level probe in longitudinal section.

FIG. 2 shows a section containing the longitudinal axis of the level probe 1. The housing of the level probe 1 includes on its two ends exposed to the environment, in each case, a sealed opening. The housing is composed of four tubular housing sections 11, 12, 13, 14.

The first housing section 11 includes the pressure measuring cell 30, in the following also called the sensor, and the sensor electronics 19. In the second and third housing section 12, 13 is the main electronics 20. In the third housing section 13 is the connection to the reference pressure supply. The fourth housing section 14 includes the cable 75, via which connection to the process control station, or a superordinated control room, can be established.

In the first housing section 11 is as sensor a ceramic, pressure measuring cell 30, which communicates with the measured material through a first opening in the housing 27.

On the opposing end of the housing, the cable 75 is led through a second opening in the housing 27. The cable 75 connects the electronics of the sensor 19 with the two conductor, current loop and the pressure equalizing hose 74. The second opening, which serves for for accommodating the cable 75, is sealed by the conically tapering shape of the housing 27 and an elastomeric seal 15 applied against the inner wall of the housing. Elastomeric seal 15 surrounds the cable 75 and is biased to seal by means of helical spring 24 affixed,. The conically tapering end of the fourth housing section 14 is connected with the tubular, third housing section 13 by means of a threaded connection.

Between the first and the fourth housing section 11, 14 lie the second and the third housing section 12, 13. Connected to the conical, fourth housing section 14 surrounding the cable 75 is the third housing section 13, through which extend the electrical connecting lines of the cable 75 to the measuring electronics 19, 20 and the pressure equalizing hose 74 for transmission of the reference pressure of the atmosphere to the ceramic, pressure measuring cell 30. For transfer of the atmospheric air pressure of the pressure equalizing hose 74 in the cable 75 to the air hose 37, which is connected with the pressure measuring cell 30, a pressure equalization effecting, protective plug 5 is mounted at the input to the air hose 37. In the lumen 35 of the third housing section 13, there rules, thus, the atmospheric pressure present on the outside. Additionally, the lumen 35 present in the third housing section 13 serves for volume equalization for potting compound expanding in the case of a temperature rise. In the case, in which the second potting compound, in which the main electronics 20 is embedded, expands as a result of a warming, lumen 35 can partially accommodate the second potting compound. In this way, damage to, or even a bursting of, the housing 27 is prevented.

In the second housing section 12 adjoining the third housing section 13 is, essentially, the main electronics 20 of the sensor, which converts the "raw" measurement signal into measurement data. The main electronics 20 extends, in such case, completely through the second and partially into the third housing section 12, 13 and is embedded completely in the second potting compound. For casting the second housing section 12 with potting compound, a potting compound ferrule 21 is placed on the second housing section 12 and the therein located volume filled with the second potting compound. The potting compound ferrule 21 serves, in such case, also for bounding the lumen 35 in the third housing section 13. The second potting compound is, for example, a silicone gel.

The sensor electronics 19 accommodated in the first housing section 11 is mechanically decoupled from the main electronics 20. For such purpose, the first carrier element 26, on which the sensor electronics 19 is applied, is connected with the second carrier element 28, on which the main electronics 20 is applied, via a Flexible circuit board 34. The first housing section 11 is completely filled with a foamed potting compound and includes a ceramic insert 10, in which the sensor electronics 19 is accommodated. Insert 10 is tightly fit in the housing 27. Additionally, insert 10 includes a filling tube 41, by means of which the foamed potting compound is filled into the first housing section 11.

Insert 10 is, in such case, anchored in the wall of the housing 27 in such a manner that, by screwing the threaded connection, via which the first housing section 11 is connected with the second housing section 12, the insert 10 is secured and pressed against the ceramic, pressure measuring cell 30. Thus, the pressure measuring cell 30 seals the housing 27 relative to the exterior. For such purpose, the sensor ferrule 29 includes a shoulder 42, against which the pressure measuring cell 30 lies and is supported.

For assembly, the first carrier element 26 is pushed and the thereon applied sensor electronics 19 into the first groove 38 provided in the insert 10, whereby the first carrier element 26 in is positioned a provided position within the housing 27. This first groove 38 orients the first carrier element 26 and the thereon mounted sensor electronics 19 within the insert 10 along the longitudinal axis of the level probe 1. The subsequent casting of potting compound into the insert 10 then fixes the first carrier element 26 in the insert 10.

Pressed into the first housing section 11 into the sensor ferrule 29 is a centering ring 33 for positioning the pressure measuring cell 30. The centering ring 33 inserts three springs to center the pressure measuring cell 30. The pressure measuring cell 30 with soldered-on sensor electronics and the ceramic insert 10 is, in such case, pressed by means of a threaded ring 36 against an 0-ring 6 on the pressure measuring cell 30 and sealed. In such case, the force is transferred to the pressure measuring cell 30 via a collar 8 of the ceramic insert 10.

The assembly composed of the sensor ferrule 29, the ceramic, pressure measuring cell 30 and the insert 10 is filled with potting compound by means of the filling tube 41 integrated in the insert. The potting compound is preferably a foamed potting compound. The uniform filling of the first housing section 11 subdivided by the first carrier element 26 into a first and a second volume portion is achieved by a communication orifice 40 in the first carrier element 26. The filling is dependent, in such case, among other things, on the geometry of the sensor assembly composed of sensor ferrule 29, pressure measuring cell 30 and insert 10, the geometry of the first carrier element 26 and the viscosity of the potting compound. Then, the sensor electronics 19 can be connected via a pin header 3 mounted terminally on the insert 10. Pin header 3 contacts the first carrier element 26 with the sensor electronics 19 and protrudes from the first housing section 11. The pin header 3 of the insert 10 is connected, preferably soldered, via a flexible circuit board 34 with the main electronics 20. The second carrier element 28, on which the main electronics 20 is applied, is positionable by means of a second groove 39 on the ceramic insert 10. Serving as holding apparatus for the first and/or second carrier element 26, 28 can also be guide rails (not shown) mounted in-wall on the insert 10. The first and/or second carrier element 26, 28 is, in such case, inserted into the rails.

For protecting the main electronics 20, the second housing section 12 is filled with a potting compound, for example, a silicone potting compound. For such purpose, is a potting compound ferrule 21 insertd, which limits the volume of cast substance.

In the case of measuring devices known from the state of the art, the entire inner space of the housing 27 is filled with a single, compact potting compound. In the case of temperature changes, this compact potting compound expands very strongly. In the case of expansion, the potting compound presses on the housing 27 and on the (pressure) measuring cell 30. This circumstance has a large influence on the measurement signal. A further temperature dependent effect is that, in the case of expansion of the potting compound, the potted carrier elements 26, 28 are drawn in one direction. These disadvantages are eliminated by the various embodiments of the invention. Thus, the housing 27 can be filled with two different potting compounds. Preferably, the first potting compound is a compressible potting compound. Furthermore, by the partially movable suspension of the first or second carrier element 26, (especially a carrier element in the form of a circuit board) in the first or second groove 38, 39, a warping of the circuit board due to temperature changes is prevented or at least reduced.

In the case of, temperature changes, the, in a form of embodiment of the invention, compressible, potting compound, especially one in the form of a foam, does e.g. expand, but, however, exercises negligible pressure on the measuring system. Additionally, the foam keeps the measuring system stable and the air enclosed in the foam compensates for the expansion of the potting compound.

Figure 3:
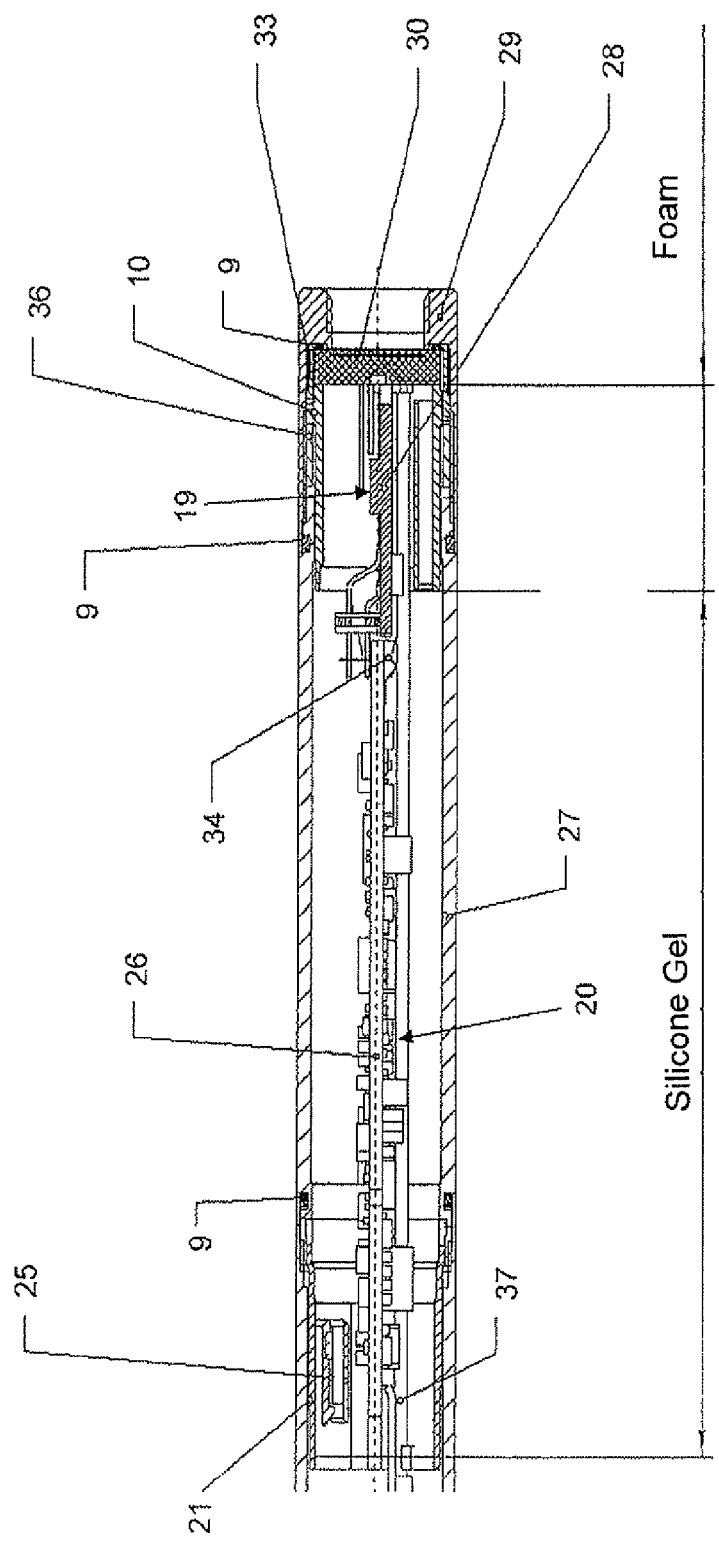
FIG. 3 is a view of the construction of the first and second housing sections of the level probe.

FIG. 3 shows an enlarged view of the level probe 1, especially of the first and second housing section 11, 12. FIG. 3 shows the second housing section 12 potted with a silicone gel and the first housing section 11 potted with a foam. The potting compound enables a manufacturing of the measuring apparatus of the invention to meet the Ex protection standards. Additionally, vibration resistance and moisture protection are improved by the two-part potting compound.

Figure 4:
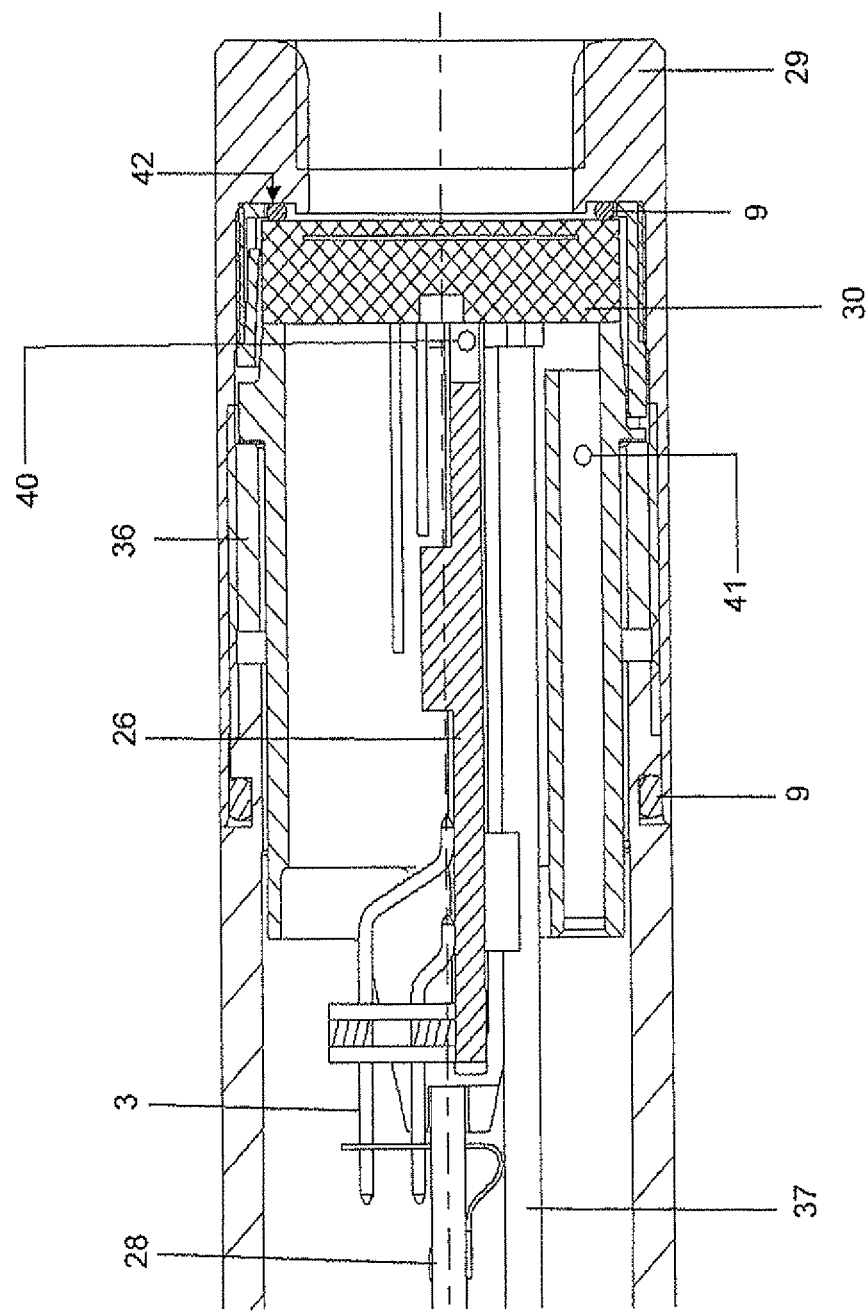
FIG. 4 is an enlarged view of the first housing section.

FIG. 4 shows a detailed, schematic view of the first housing section 11 with the sensor ferrule 29, the pressure measuring cell 30, the sensor electronics 19 and the insert 10.

Toward the second housing section 12, insert 10 includes a pin header 3 for establishing an electrical connection. Pin header 3 contacts the sensor electronics 19 and is connected via a flexible circuit board 34 with the main electronics 20. Furthermore, the air hose 37 is brought through the insert 10, for supplying the pressure measuring cell 30 with the reference pressure.

Figure 5:
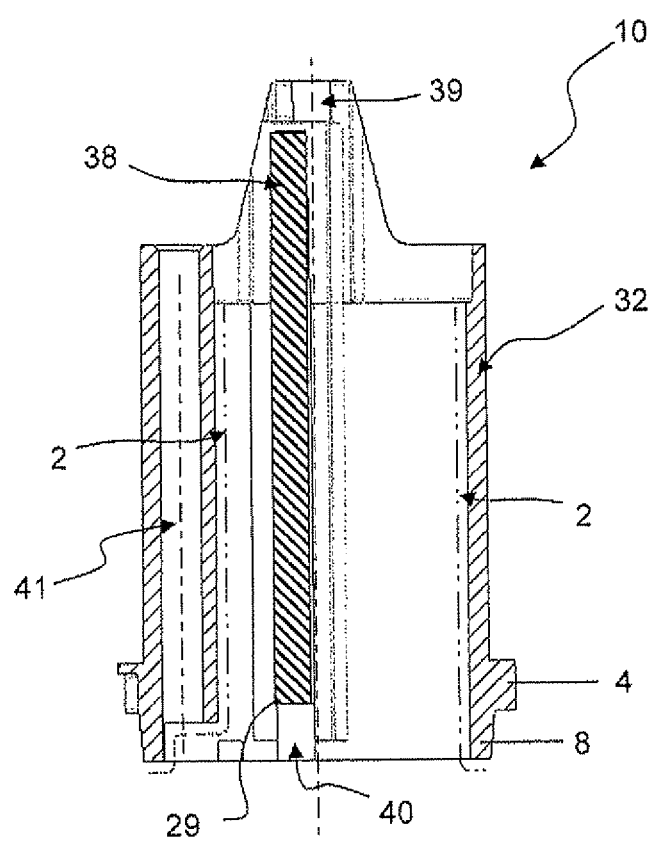
FIG. 5 is a view of the insert with an electrically conductive coating, in longitudinal section.

FIG. 5 shows a schematic view of the tubular insert 10 having a shielding, electrically conductive coating 2. Coating 2 is deposited on the inner surface of insert 10 and indicated by the dashed line. Insert 10 includes a collar 8, with which the insert 10 lies against the pressure measuring cell 30 and which transmits the force on the pressure measuring cell 30 necessary for sealing. Furthermore, the tubular insert 10 has on its outside a shoulder 4, which at least partially surrounds the insert 10. By screwing the threaded ring 36 on the sensor ferrule 29 tight against the shoulder 4, the force necessary for sealing the housing is transferred onto the pressure measuring cell 30. The filling tube 41 is placed, or formed, on the inside of the insert 10. Filling tube 41 extends along the wall 32 of the insert 10. Furthermore, on the wall 32 of the cylindrical insert 10, a first groove 38 is provided for holding the sensor electronics 19. This first groove 38 includes a stop, up to which the first carrier element 26 is introducible into the first groove 28. Additionally, insert 10 has toward the second housing section 12 a second groove 39, into which the second carrier element 28 of the main electronics 20 can be inserted.

For assembling the measuring apparatus, the sensor electronics located on the first carrier element 29 is electrically connected with the pressure measuring cell 30. Then, the first carrier element 29 is inserted from the base of the insert 10 into the first groove 38, up to the stop. The insert 10 is then inserted into the sensor ferrule 29 and fixed in the sensor ferrule 29 by means of a threaded ring 36, so that the pressure measuring cell 30 seals the opening of the sensor ferrule 29 facing the environment. After insertion of the pressure measuring cell 30 and insert 10 into the sensor ferrule, the floor of the insert 10 is then formed by the pressure measuring cell 30.

The pressure measuring cell 30 includes on its side facing away from the medium likewise an electrically conductive coating 2, so that, by arranging the insert 10 in the sensor ferrule 29, there is electrical contact between the coatings 2.

The invention claimed is:

1. An apparatus for determining and/or monitoring a physical and/or chemical, measured variable of a medium, comprising:
   a housing, especially an elongated housing;
   a sensor arranged in said housing; said sensor serves for registering the measured variable, said housing has at least one opening, through which said sensor comes in contact with the medium, said housing has a first housing section, in which said sensor and a sensor electronics are arranged, said sensor electronics is arranged on a first carrier element, wherein:

said sensor electronics serves for changing the measured variable into an analog, electrical signal; characterized in that an insert is applied in said first housing section, in which said sensor electronics is arranged;

said insert is tubular.

2. The apparatus as claimed in claim 1, wherein:
said insert is cast, at least partially, with a first potting compound, especially a foamed potting compound.

3. The apparatus as claimed in claim 1, wherein:
said first carrier element divides the internal volume of said insert into at least a first and a second volume portion, and at least one communication orifice is provided, which connects said first volume portion with said second volume portion.

4. The apparatus as claimed in claim 3, wherein:
a cavity in said first carrier element forms said communication orifice and/or said first carrier element and said insert are so matched to one another, that a cavity between said insert and said first carrier element forms said communication orifice.

5. The apparatus as claimed in claim 1, wherein:
at least one filling tube is present in said insert and serves to fill said insert with the first potting compound, especially a foamed potting compound.

6. The apparatus as claimed in claim 5, wherein:
at least a first securement means, by means of which said first carrier element is arranged in a provided position at least partially within said insert, and/or said filling tube are/is component(s) of said insert provided in said first housing section.

7. The apparatus as claimed in claim 5, wherein:
said at least one filling tube brings the first potting compound at least to a height perpendicular to the longitudinal axis of said housing in said insert, up to which said communication orifice extends.

8. The apparatus as claimed in claim 1, wherein:
a second housing section is provided, which borders on said first housing section, in said second housing section, a main electronics is placed on a second carrier element;

the main electronics is electrically connected, especially via a flexible line arrangement, with said sensor electronics; and said main electronics serves to calculate a measured value from the analog electrical signal or a signal derived therefrom.

9. The apparatus as claimed in claim 8, wherein:
at least a second securement means is provided, especially one on said insert, by which said main electronics is arranged, especially movably, in a provided position in said second housing section.

10. The apparatus as claimed in claim 8, wherein:
said main electronics is cast, at least partially, with a second potting compound.

11. A method for manufacturing an apparatus for determining and/or monitoring a chemical and/or physical, measured variable of a medium, wherein the apparatus has a housing with a first housing section, a sensor and sensor electronics arranged in the first housing section, the housing has at least one opening, through which the sensor comes in contact with the medium, and the sensor electronics serves for changing the measured variable into an analog electrical signal, the method comprising the steps of:

mounting the sensor electronics on a first carrier element and arranging same in an insert; and the insert is tubular and the insert is applied in the first housing section.

12. The method as claimed in claim 11, wherein:
the sensor electronics is cast with a first potting compound by filling the potting compound into the insert, especially through at least one filling tube.

13. The method as claimed in claim 11, wherein:
a main electronics contained in a second housing section of the housing is positioned in the second housing section by means of a second securement means, especially a second securement means provided on the insert; and the main electronics serves to calculate a measured value from the analog electrical signal or a signal derived therefrom.

14. The method as claimed in claim 1, wherein:
the sensor electronics is connected electrically with the main electronics via a flexible circuit board, especially a flexible, line arrangement.

* * * * *